US012475800B2

(12) United States Patent  (10) Patent No.: US 12,475,800 B2
Verma et al.  (45) Date of Patent: Nov. 18, 2025

(54) SYSTEMS AND METHODS FOR DYNAMIC AIRCRAFT FLIGHT PATH GENERATION

(71) Applicant: HONEYWELL INTERNATIONAL INC., Charlotte, NC (US)

(72) Inventors: Vishal Singh Verma, Bangalore (IN); Rama Moorthi Munusamy, Bangalore (IN); Priyanka P, Bangalore (IN); Chiranjeevi Kamireddy, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 180 days.

(21) Appl. No.: 18/447,971

(22) Filed: Aug. 10, 2023

(65) Prior Publication Data

US 2025/0006062 A1  Jan. 2, 2025

(30) Foreign Application Priority Data

Jun. 28, 2023  (IN) .............................. 202311043333

(51) Int. Cl.
  *G08G 5/34*  (2025.01)
  *G08G 5/25*  (2025.01)
  *G08G 5/80*  (2025.01)

(52) U.S. Cl.
  CPC ................. *G08G 5/34* (2025.01); *G08G 5/25* (2025.01); *G08G 5/80* (2025.01)

(58) Field of Classification Search
  CPC .............. G08G 5/34; G08G 5/25; G08G 5/80
  See application file for complete search history.

(56) References Cited

U.S. PATENT DOCUMENTS 9,524,647 B2 * 12/2016 Kohn-Rich ............ G01C 21/20
2017/0168680 A1 * 6/2017 Fourneau-Pelletier ......................
    G06F 3/04845

(Continued)

FOREIGN PATENT DOCUMENTS

CN   106774425 A   5/2017
CN   112309175 A   2/2021

(Continued)

OTHER PUBLICATIONS

Cheung, Jacob C.H., "Flight Planning: Node-Based Trajectory Prediction and Turbulence Avoidance," Meteorological Applications, Meteorol. Appl. 25: 78-85 (2018), Published online Aug. 24, 2017 in Wiley Online Library, (wileyonlinelibrary.com) DOI: 10.1002/met.1671.

*Primary Examiner* — Jason Holloway
*Assistant Examiner* — Blake A Wood
(74) *Attorney, Agent, or Firm* — Ingrassia Fisher & Lorenz, LLP

(57) ABSTRACT

A current flight path of an aircraft is defined with respect to a two-dimensional mesh plane including a first plurality of nodes. Each node is associated with a pre-designated location. First, second, and third nodes that are the closest to a current aircraft location are identified. Neighboring aircraft data associated with neighboring aircraft disposed within a pre-defined distance of the aircraft is received. The neighboring aircraft data includes a neighboring aircraft location for each the neighboring aircraft. First, second, and third node weights are allocated to the first, second, and third nodes based in part on the pre-designated locations of the first, second, and third nodes with respect to the neighboring aircraft locations. A modified flight path based at least in part on the first, second, and third node weights is generated for (Continued)

display as a suggested flight path on an onboard display device.

20 Claims, 4 Drawing Sheets

(56) References Cited

U.S. PATENT DOCUMENTS

| | | | |
|---|---|---|---|
| 2020/0168104 A1* | 5/2020 | Holder | G08G 5/55 |
| 2020/0250993 A1* | 8/2020 | Li | G08G 5/32 |
| 2020/0251000 A1 | 8/2020 | Evans et al. | |
| 2021/0358310 A1 | 11/2021 | Sachs et al. | |
| 2022/0270495 A1 | 8/2022 | Pele | |
| 2022/0351627 A1* | 11/2022 | Ali | G08G 5/53 |
| 2023/0112803 A1* | 4/2023 | Herriot | G08G 5/21 |
| | | | 701/415 |

FOREIGN PATENT DOCUMENTS

| | | |
|---|---|---|
| CN | 113778119 A | 12/2021 |
| CN | 109634304 B | 7/2022 |
| JP | 2020535545 A | 12/2020 |
| KR | 102099136 B1 | 5/2020 |
| KR | 102156801 B1 | 9/2020 |
| KR | 1020210108479 A | 9/2021 |

* cited by examiner

SYSTEMS AND METHODS FOR DYNAMIC AIRCRAFT FLIGHT PATH GENERATION

CROSS-REFERENCE TO RELATED APPLICATION

This application claims priority to India Provisional Patent Application No. 202311043333, filed Jun. 28, 2023, the entire content of which is incorporated by reference herein.

TECHNICAL FIELD

The present invention generally relates to aircraft operations and more particularly relates to systems and methods for dynamic aircraft flight path generation.

BACKGROUND

Air traffic management in high density traffic scenarios can create challenges for air traffic control (ATC). An increase in unmanned aircraft systems (UAS) in high density traffic airspace may create additional work for ATC. Static flight path planning may not accommodate potential mid-air collision scenarios that may result as a result of real time changes in the locations, the velocities, and the flight paths of aircraft in high density traffic areas.

Hence there is a need for systems and methods for dynamic aircraft flight path generation.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a dynamic aircraft flight path generation system includes a flight management system (FMS), a communication circuit, an onboard display device, and a controller. The controller is communicatively coupled to the FMS, the communication circuit, and the onboard display device. The controller is configured to: receive a current flight path of an aircraft from a current aircraft location to a destination location from the FMS; define the current flight path with respect to a two-dimensional mesh plane including a first plurality of nodes, wherein each node in the two-dimensional mesh plane is associated with a pre-designated location; identify first, second, and third nodes of the first plurality of nodes that are the closest to the current aircraft location; receive neighboring aircraft data associated with at least one neighboring aircraft disposed within a pre-defined distance of the aircraft via the communication circuit, the neighboring aircraft data including a neighboring aircraft location associated with each of the at least one neighboring aircraft; allocate first, second, and third node weights to the first, second, and third nodes based at least in part on the pre-designated locations of the first, second, and third nodes with respect to the neighboring aircraft location of the at least one neighboring aircraft; and generate a modified flight path based at least in part on the first, second, and third node weights for display as a suggested flight path on the onboard display device.

In various embodiments, a method of dynamically generating an aircraft flight path includes: receiving a current flight path of an aircraft from a current aircraft location to a destination location from a flight management system (FMS) of the aircraft; defining, by a dynamic aircraft flight path generation system of the aircraft, the current flight path with respect to a two-dimensional mesh plane including a first plurality of nodes, wherein each node in the two-dimensional mesh plane is associated with a pre-designated location; identifying, by the dynamic aircraft flight path generation system, first, second, and third nodes of the first plurality of nodes that are the closest to the current aircraft location; receiving, at the dynamic aircraft flight path generation, neighboring aircraft data associated with at least one neighboring aircraft disposed within a pre-defined distance of the aircraft via a communication circuit of the aircraft, the neighboring aircraft data including a neighboring aircraft location associated with each of the at least one neighboring aircraft; allocating, by the dynamic aircraft flight path generation system, first, second, and third node weights to the first, second, and third nodes based at least in part on the pre-designated locations of the first, second, and third nodes with respect to the neighboring aircraft location of the at least one neighboring aircraft; and generating, by the dynamic aircraft flight path generation system, a modified flight path based at least in part on the first, second, and third node weights for display as a suggested flight path on an onboard display device of the aircraft.

Furthermore, other desirable features and characteristics of the system and method for dynamic aircraft flight path generation become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
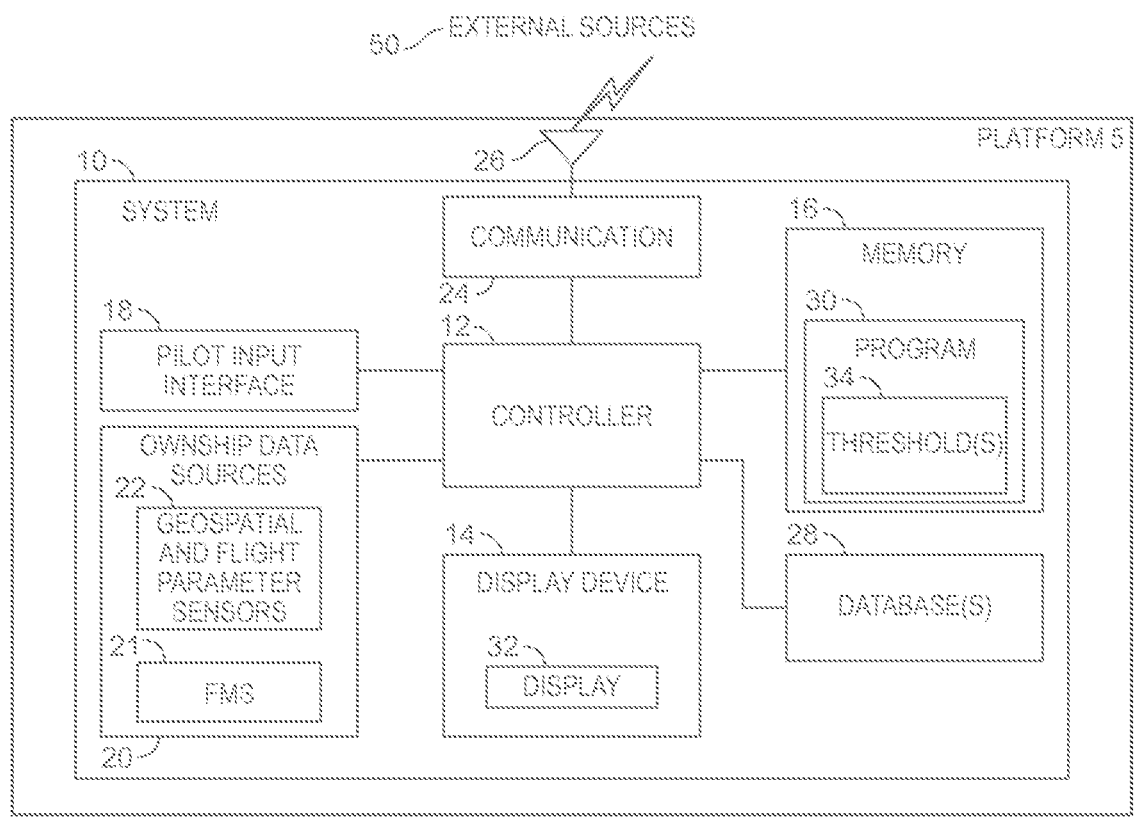
FIG. 1 is a block diagram representation of a system configured to implement dynamic aircraft flight path generation in accordance with least one embodiment.

FIG. 1 is a block diagram representation of a system 10 configured to implement dynamic aircraft flight path generation in accordance with an embodiment (shortened herein to "system" 10), as illustrated in accordance with an exemplary and non-limiting embodiment of the present disclosure. The system 10 may be utilized onboard a mobile platform 5, as described herein. In various embodiments, the mobile platform is an aircraft, which carries or is equipped with the system 10. As schematically depicted in FIG. 1, the system 10 includes the following components or subsystems, each of which may assume the form of a single device or multiple interconnected devices: a controller circuit 12 operationally coupled to: at least one display device 14; computer-readable storage media or memory 16; an optional input interface 18, and ownship data sources 20 including, for example, a flight management system (FMS) 21 and an array of flight system state and geospatial sensors 22.

In various embodiments, the system 10 may be separate from or integrated within: the flight management system (FMS) 21 and/or a flight control system (FCS). Although schematically illustrated in FIG. 1 as a single unit, the individual elements and components of the system 10 can be implemented in a distributed manner utilizing any practical number of physically distinct and operatively interconnected pieces of hardware or equipment. When the system 10 is utilized as described herein, the various components of the system 10 will typically all be located onboard the mobile platform 5.

The term "controller circuit" (and its simplification, "controller"), broadly encompasses those components utilized to carry-out or otherwise support the processing functionalities of the system 10. Accordingly, the controller circuit 12 can encompass or may be associated with a programmable logic array, application specific integrated circuit or other similar firmware, as well as any number of individual processors, flight control computers, navigational equipment pieces, computer-readable memories (including or in addition to the memory 16), power supplies, storage devices, interface cards, and other standardized components. In various embodiments, the controller circuit 12 embodies one or more processors operationally coupled to data storage having stored therein at least one firmware or software program (generally, computer-readable instructions that embody an algorithm) for carrying-out the various process tasks, calculations, and control/display functions described herein. During operation, the controller circuit 12 may be programmed with and execute the at least one firmware or software program, for example, a program 30, that embodies an algorithm described herein for dynamic aircraft flight path generation in accordance with an embodiment on a mobile platform 5, where the mobile platform 5 is an aircraft, and to accordingly perform the various process steps, tasks, calculations, and control/display functions described herein.

The controller circuit 12 may exchange data, including real-time wireless data, with one or more external sources 50 to support operation of the system 10 in embodiments. In this case, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

The memory 16 is a data storage that can encompass any number and type of storage media suitable for storing computer-readable code or instructions, such as the aforementioned software program 30, as well as other data generally supporting the operation of the system 10. The memory 16 may also store one or more threshold 34 values, for use by an algorithm embodied in software program 30. One or more database(s) 28 are another form of storage media; they may be integrated with memory 16 or separate from it.

In various embodiments, aircraft-specific parameters and information for an aircraft may be stored in the memory 16 or in a database 28 and referenced by the program 30. Non-limiting examples of aircraft-specific information includes an aircraft weight and dimensions, performance capabilities, configuration options, and the like.

Flight parameter sensors and geospatial sensors 22 supply various types of data or measurements to the controller circuit 12 during an aircraft flight. In various embodiments, the geospatial sensors 22 supply, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data.

With continued reference to FIG. 1, the display device 14 can include any number and type of image generating devices on which one or more avionic displays 32 may be produced. When the system 10 is utilized for a manned aircraft, the display device 14 may be affixed to the static structure of the Aircraft cockpit as, for example, a Head Down Display (HDD) or Head Up Display (HUD) unit. In various embodiments, the display device 14 may assume the form of a movable display device (e.g., a pilot-worn display device) or a portable display device, such as an Electronic Flight Bag (EFB), a laptop, or a tablet computer carried into the aircraft cockpit by a pilot.

At least one avionic display 32 is generated on the display device 14 during operation of the system 10; the term "avionic display" is synonymous with the term "aircraft-related display" and "cockpit display" and encompasses displays generated in textual, graphical, cartographical, and other formats. The system 10 can generate various types of lateral and vertical avionic displays 32 on which map views and symbology, text annunciations, and other graphics pertaining to flight planning are presented for a pilot to view. The display device 14 is configured to continuously render at least a lateral display showing the aircraft at its current location within the map data. The avionic display 32 generated and controlled by the system 10 can include graphical user interface (GUI) objects and alphanumerical input displays of the type commonly presented on the screens of multifunction control display units (MCDUs), as well as Control Display Units (CDUs) generally. Specifically, embodiments of the avionic displays 32 include one or more two-dimensional (2D) avionic displays, such as a horizontal (i.e., lateral) navigation display or vertical navigation display (i.e., vertical situation display VSD); and/or on one or more three dimensional (3D) avionic displays, such as a Primary Flight Display (PFD) or an exocentric 3D avionic display.

In various embodiments, a human-machine interface is implemented as an integration of a pilot input interface 18 and a display device 14. In various embodiments, the display device 14 is a touch screen display. In various embodiments, the human-machine interface also includes a separate pilot input interface 18 (such as a keyboard, cursor control device, voice input device, or the like), generally operationally coupled to the display device 14. Via various display and graphics systems processes, the controller circuit 12 may command and control a touch screen display device 14 to generate a variety of graphical user interface (GUI) objects or elements described herein, including, for example, buttons, sliders, and the like, which are used to prompt a user to interact with the human-machine interface to provide user input; and for the controller circuit 12 to activate respective functions and provide user feedback, responsive to received user input at the GUI element.

In various embodiments, the system 10 may also include a dedicated communications circuit 24 configured to provide a real-time bidirectional wired and/or wireless data exchange for the controller 12 to communicate with the external sources 50 (including, each of: traffic, air traffic control (ATC), satellite weather sources, ground stations, neighboring aircraft, and the like). In various embodiments, the communications circuit 24 may include a public or private network implemented in accordance with Transmission Control Protocol/Internet Protocol architectures and/or other conventional protocol standards. Encryption and mutual authentication techniques may be applied, as appropriate, to ensure data security. In some embodiments, the communications circuit 24 is integrated within the controller circuit 12, and in other embodiments, the communications circuit 24 is external to the controller circuit 12.

In certain embodiments of the system 10, the controller circuit 12 and the other components of the system 10 may be integrated within or cooperate with any number and type of systems commonly deployed onboard an aircraft including, for example, an FMS 21.

The disclosed algorithm is embodied in a hardware program or software program (e.g. program 30 in controller circuit 12) and configured to operate when the aircraft is in any phase of flight. The algorithm enables dynamic aircraft flight path generation.

In various embodiments, the provided controller circuit 12, and therefore its program 30 may incorporate the programming instructions for: receiving a current flight path of the aircraft from a current aircraft location to a destination location from the FMS of the aircraft; defining the current flight path with respect to a two-dimensional mesh plane including a first plurality of nodes, wherein each node in the two-dimensional mesh plane is associated with a pre-designated location; identifying first, second, and third nodes of the first plurality of nodes that are the closest to the current aircraft location; receiving neighboring aircraft data associated with at least one neighboring aircraft disposed within a pre-defined distance of the aircraft via a communication circuit of the aircraft, the neighboring aircraft data including a neighboring aircraft location associated with each of the at least one neighboring aircraft; allocating first, second, and third node weights to the first, second, and third nodes based at least in part on the pre-designated locations of the first, second, and third nodes with respect to the neighboring aircraft location of the at least one neighboring aircraft; and generating a modified flight path based at least in part on the first, second, and third node weights for display as a suggested flight path on an onboard display device of the aircraft.

Figure 2:
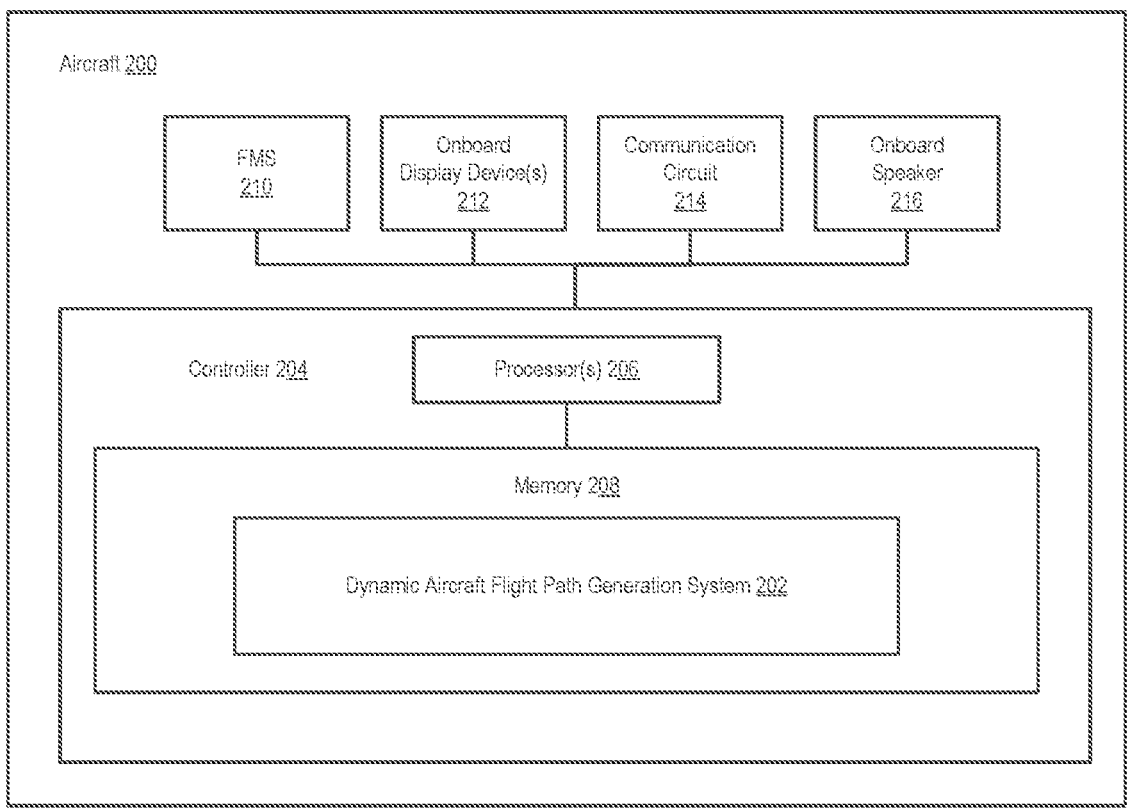
FIG. 2 is a block diagram representation of an aircraft including a dynamic aircraft flight path generation system in accordance with at least one embodiment.

Referring to FIG. 2, a block diagram representation of an aircraft 200 including a dynamic aircraft flight path generation system 202 in accordance with at least one embodiment is shown. In various embodiments, the configuration of the aircraft 200 is similar to the configuration of platform 5 described with reference to FIG. 1. The aircraft 200 includes at least one controller 204. The controller 204 includes at least one processor 206 and at least one memory 208. The memory 208 includes the dynamic aircraft flight path generation system 202. In various embodiments, the controller 304 may include additional components that facilitate operation of the controller 204.

The controller 204 is configured to be communicatively coupled to an FMS 210, one or more onboard display devices 212, a communication circuit 214, and an onboard speaker 216. The FMS 210 is similar to the FMS 21 in FIG. 1. The one or more onboard display devices 212 are similar to the onboard devices 14 in FIG. 1. The communication circuit 214 is similar to the communication circuit 24 in FIG. 1. While the dynamic aircraft flight path generation system 202 has been described as a component of a controller 204, in various embodiments, that dynamic aircraft flight path generation system 202 may be a component of the FMS of the aircraft 200. The aircraft 200, the controller 204 and/or the dynamic aircraft flight path generation system 202 may include additional components that facilitate operation of the dynamic aircraft flight path generation system 202. The operation of the dynamic aircraft flight path generation system 202 will be described in further detail below with reference to FIG. 3.

Figure 3:
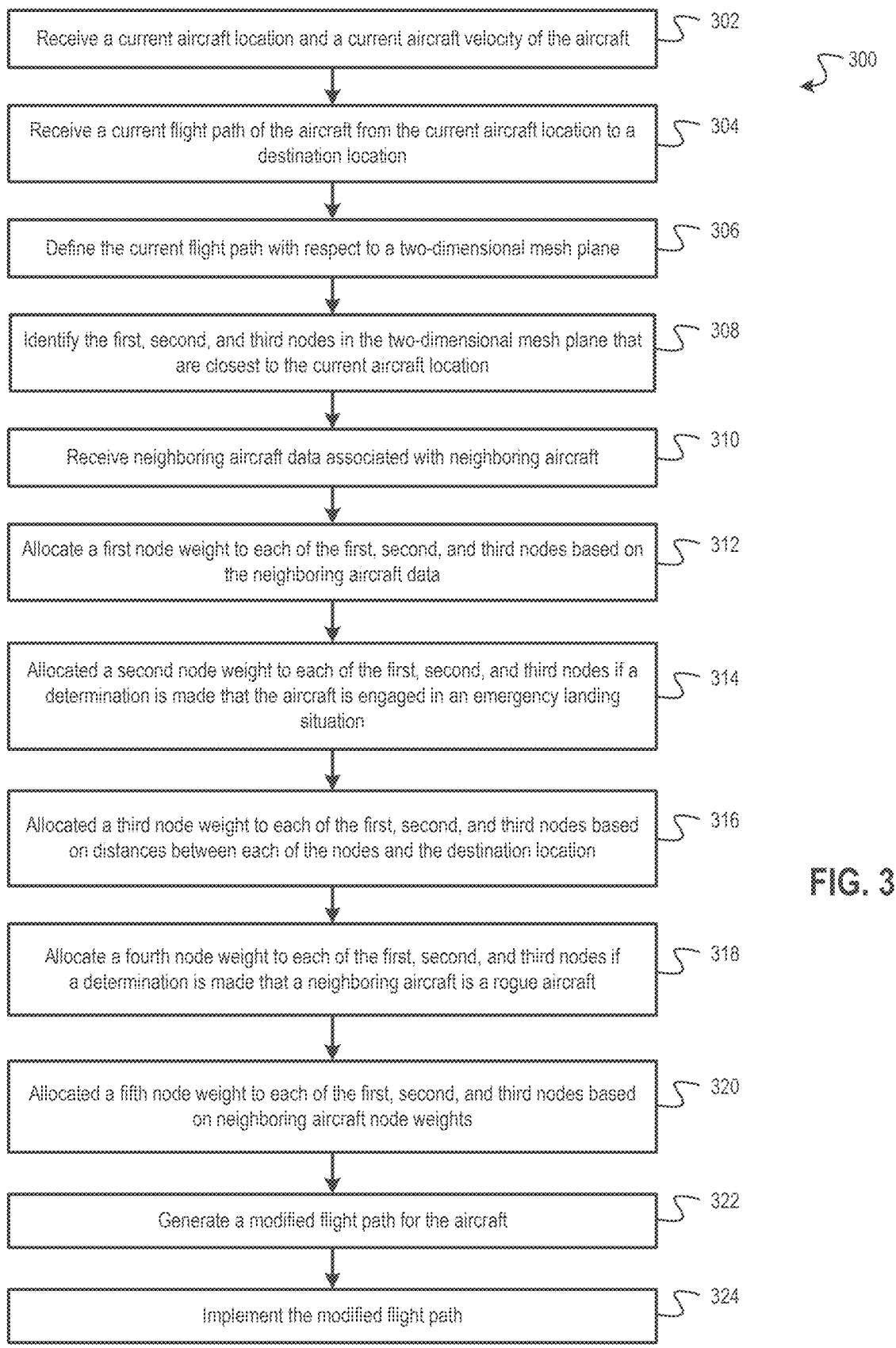
FIG. 3 is a flowchart representation of a method of dynamically generating an aircraft flight path in accordance with at least one embodiment.

Referring to FIG. 3, a flowchart representation of a method 300 of dynamically generating an aircraft flight path in accordance with at least one embodiment is shown. The method 300 will be described with reference to an exemplary implementation of a dynamic flight path generation system 202. As can be appreciated in light of the disclosure, the order of operation within the method 300 is not limited to the sequential execution as illustrated in FIG. 3 but may be performed in one or more varying orders as applicable and in accordance with the present disclosure.

At 302, the dynamic aircraft flight path generation system 202 receives a current aircraft location and a current aircraft velocity of the aircraft 200. In various embodiments, the dynamic aircraft flight path generation system 202 receives the current aircraft location and the current aircraft velocity from the FMS 210 of the aircraft 200. In various embodiments, the dynamic aircraft flight path generation system 202 receives the current aircraft location and the current aircraft velocity from a satellite-based augmentation (SBA) system via the communication circuit 214 of the aircraft 200.

At 304, the dynamic aircraft flight path generation system 202 receives a current flight path of the aircraft 200 from the current aircraft location to a destination location. In various embodiments, the dynamic aircraft flight path generation system 202 receives the current flight path from the FMS 210 of the aircraft 200. In various embodiments, the current aircraft location is a current waypoint and the destination location is a destination waypoint on the current flight path of the aircraft 200.

At 306, the dynamic aircraft flight path generation system 202 defines the current flight path with respect to a two-dimensional mesh plane. Each node in the two-dimensional mesh plane is associated with a pre-designated location. In various embodiments, the pre-defined location associated with each node is defined by a longitude and a latitude. In various embodiments, the two-dimensional mesh plane is an equidistant two-dimensional mesh plane where adjacent nodes in each row and in each column of the two-dimensional mesh are separated by equal distances.

At 308, the dynamic aircraft flight path generation system 202 identifies the first, second, and third nodes in the two-dimensional mesh plane that are closest to the current aircraft location of the aircraft 200.

At 310, the dynamic aircraft flight path generation system 202 receives neighboring aircraft data associated with neighboring aircraft via the communication circuit 214 of the aircraft. In at least one embodiment, the neighboring aircraft are disposed within a pre-defined distance of the aircraft 200. The neighboring aircraft may include one or more neighboring aircraft disposed within the pre-defined distance of the aircraft 200. In various embodiments, the neighboring aircraft include manned aircraft. In various embodiments, the neighboring aircraft include unmanned aircraft. In various embodiments, the neighboring aircraft include manned aircraft and unmanned aircraft. In at least embodiment, the pre-defined distance is within a five kilometer turn radius of the aircraft 200.

In various embodiments, the dynamic aircraft flight path generation system 202 receives the neighboring aircraft data from a neighboring aircraft via peer-to-peer communication. In various embodiments, the dynamic aircraft flight path generation system 202 receives the neighboring aircraft data from a neighboring aircraft via a broadcast communication channel. In various embodiments, the dynamic aircraft flight path generation system 202 receives the neighboring aircraft data from a ground central station. In various embodiments, the dynamic aircraft flight path generation system 202 receives neighboring aircraft data associated with at least one neighboring aircraft from the neighboring aircraft and neighboring aircraft data associated with at least one neighboring aircraft from the central ground station.

In various embodiments, the neighboring aircraft data associated with each neighboring aircraft includes a neighboring aircraft location of that neighboring aircraft. In various embodiments, the neighboring aircraft data associated with each neighboring aircraft includes a neighboring aircraft velocity of that neighboring aircraft. In various embodiments, the neighboring aircraft data from one or more neighboring aircraft includes the node weights assigned to each of the first, second, and third nodes by that neighboring aircraft. In various embodiments, the neighboring aircraft data from one or more neighboring aircraft includes a current flight path of that neighboring aircraft.

At 312, the dynamic aircraft flight path generation system 202 allocates a first node weight to each of the first, second, and third nodes based on the neighboring aircraft data. In various embodiments, the dynamic aircraft flight path generation system 202 allocates the first node weight to each of the first, second, and third nodes based on the pre-designated locations of the first, second, third nodes with respect to the neighboring aircraft location(s) of the neighboring aircraft. In various embodiments, the dynamic aircraft flight path generation system 202 allocates the first node weight to each of the first, second, and third nodes based on the pre-designated locations of the first, second, third nodes with respect to the neighboring aircraft location(s) and the neighboring aircraft velocity (velocities) associated with the neighboring aircraft. In various embodiments, the dynamic aircraft flight path generation system 202 allocates a first node weight to each of the first, second, and third nodes based on the pre-designated locations of the first, second, third nodes with respect to the neighboring aircraft location(s), the neighboring aircraft velocity (velocities), and the current flight path(s) associated with each of the neighboring aircraft.

The first node weights are associated with a risk of mid-air collision with a neighboring aircraft. In at least one embodiment, the highest first node weight is associated with the node that presents the greatest risk of a potential mid-air collision with a neighboring aircraft, the lowest first node weight is associated with the node that presents the lowest risk of a potential mid-air collision with a neighboring aircraft, and the second highest first node weight is associated with the node that presents a lower risk of a potential mid-air collision with a neighboring aircraft than the node with the highest node weight and a greater risk of a potential mid-air collision with a neighboring aircraft than the node with the lowest node weight. The lower the first node weight, the lower the risk of a mid-air collision with a neighboring aircraft on a modified flight path of the aircraft 200 via that node. In various embodiments, the total node weight assigned to each of the first, second, and third nodes is the first node weight. The modified flight path is generated by the dynamic aircraft flight path generation system 202 based on the total node weight allocated to each node.

At 314, the dynamic aircraft flight path generation system 202 allocates a second node weight to each of the first, second, and third nodes if a determination is made that the aircraft 200 is engaged in an emergency landing situation. When the aircraft 200 is engaged in an emergency landing situation, the current flight path of the aircraft 200 is updated to reflect an emergency landing flight path associated with an emergency landing location. The dynamic aircraft flight path generation system 202 identifies a first distance between the first node and the emergency landing location, a second distance between the second node and the emergency landing location, and a third distance between the third node and the emergency landing location.

The second node weights are associated with the proximity of the aircraft 200 to the emergency landing location via a node. In at least one embodiment, the highest second node weight is associated with the node having the highest distance between that node and the emergency landing location, the lowest second node weight is associated with the node having the shortest distance between that node and the emergency landing location, and the second highest second node weight is associated with the node having a distance between that node and the emergency landing location that is greater than the shortest distance and less than the longest distance. The lower the second node weight, the closer the aircraft 200 is to the emergency landing location on a modified flight path of the aircraft 200 via that node.

In at least one embodiment, the second node weight has a lower priority than the first node weight. The allocation of a first component of the node weight as defined by the first node weight has a higher priority than a second component of the node weight as defined by the second node weight. In various embodiments, the total node weight assigned to each of the first, second, and third nodes is a combination of the first node weight and the second node weight associated with that node. The modified flight path is generated by the dynamic aircraft flight path generation system 202 based on the total node weight associated with each node.

At 316, the dynamic aircraft flight path generation system 202 allocates a third node weight to each of the first, second, and third nodes based on distances between each of the nodes and the destination location. The dynamic aircraft flight path generation system 202 identifies a first distance between the first node and the destination location, a second distance between the second node and the destination location, and a third distance between the third node and the destination location.

The third node weights are associated with the proximity of the aircraft 200 to the destination location via a node. In at least one embodiment, the highest third node weight is associated with the node having the highest distance between that node and the destination location, the lowest third node weight is associated with the node having the shortest distance between that node and the destination location, and the second highest third node weight is associated with the node having a distance between that node and the destination location that is greater than the shortest distance and less than the longest distance. The lower the third node weight of a node, the closer the aircraft 200 is to the destination location on a modified flight path of the aircraft 200 via that node.

In at least one embodiment, the third node weight has a lower priority than the first node weight. The allocation of a first component of the node weight as defined by the first node weight has a higher priority than a third component of the node weight as defined by the third node weight. In various embodiments, the total node weight assigned to each of the first, second, and third nodes is a combination of the first node weight and the third node weight associated with that node. The modified flight path is generated by the dynamic aircraft flight path generation system 202 based on the total node weight associated with each node.

At 318, the dynamic aircraft flight path generation system 202 allocates a fourth node weight to each of the first, second, and third nodes if a determination is made that a neighboring aircraft is a rogue aircraft. The neighboring aircraft location of the rogue aircraft is a rough aircraft location. The dynamic aircraft flight path generation system 202 identifies a first distance between the first node and the rogue aircraft location, a second distance between the second node and the rogue aircraft location, and a third distance between the third node and the rogue aircraft location.

The fourth node weights are associated with the proximity of the aircraft 200 to the rogue aircraft location via a node. In at least one embodiment, the highest fourth node weight is associated with the node having with the shortest distance between that node and the rogue aircraft location, the lowest fourth node weight is associated with the node having the longest distance between that node and the rogue aircraft location, and the second highest fourth node weight is associated with the node having a distance between that node and the rogue aircraft location that is greater than the shortest distance and less than the longest distance. The lower the fourth node weight of a node, the further away the aircraft 200 is from the rogue aircraft location on a modified flight path of the aircraft 200 via that node.

In at least one embodiment, the fourth node weight has a lower priority than the first node weight. The allocation of a first component of the node weight as defined by the first node weight has a higher priority than a fourth component of the node weight as defined by the fourth node weight. In various embodiments, the total node weight assigned to each of the first, second, and third nodes is a combination of the first node weight and the fourth node weight associated with that node. In various embodiments, the total node weight assigned to each of the first, second, and third nodes is a combination of the first node weight, the second node weight, and the fourth node weight associated with that node. In various embodiments, the total node weight assigned to each of the first, second, and third nodes is a combination of the first node weight, the third node weight, and the fourth node weight associated with that node. The modified flight path is generated by the dynamic aircraft flight path generation system 202 based on the total node weight associated with each node.

At 320, the dynamic aircraft flight path generation system 202 allocates a fifth node weight to each of the first, second, and third nodes based on neighboring aircraft node weights. In various embodiments, the neighboring aircraft data received from each neighboring aircraft includes first, second, and third neighboring aircraft node weights allocated by that neighboring aircraft to each of the first, second, and third nodes, respectively.

The fifth node weights are associated with the neighboring aircraft node weights allocated by the neighboring aircraft to each of the first, second, and third nodes. In at least one embodiment, the highest fifth node weight is associated with the node having the highest neighboring aircraft node weights allocated by the neighboring aircraft, the lowest first node weight is associated with the node having the lowest neighboring aircraft node weights allocated by the neighboring aircraft, and the second highest fifth node weight is associated with the node associated with a neighboring aircraft node weights that fall between the highest neighboring aircraft node weights and the lowest neighboring aircraft node weights. In at least one embodiment, the neighboring aircraft node weights assigned by the neighboring aircraft are aggregated to generate the highest fifth node weight, the second highest fifth node weight, the lowest fifth node weight. The lower the fifth node weight, the lower the risk of a mid-air collision with a neighboring aircraft on a modified flight path of the aircraft 200 via that node.

In at least one embodiment, the fifth node weight has a lower priority than the first node weight. The allocation of a first component of the node weight as defined by the first node weight has a higher priority than a fifth component of the node weight as defined by the fifth node weight. In various embodiments, the total node weight assigned to each of the first, second, and third nodes is a combination of the first node weight and the fifth node weight associated with that node.

In various embodiments, the total node weight assigned to each of the first, second, and third nodes is a combination of the first node weight, the second node weight, the fourth node weight, and the fifth node weight associated with that node. In various embodiments, the total node weight assigned to each of the first, second, and third nodes is a combination of the first node weight, the third node weight, the fourth node weight, and the fifth node weight associated with that node. In various embodiments, the total node weight for each node is a combination of the first node weight and one or more of the second, third, fourth, and fifth node weights. The modified flight path is generated by the dynamic aircraft flight path generation system 202 based on the total node weight associated with each node.

At 322, the dynamic aircraft flight path generation system 202 generates a modified flight path for the aircraft 200. The dynamic aircraft flight path generation system 202 generates the modified flight path for the aircraft 200 for display on an onboard display device 212 of the aircraft 200 as a suggested flight path. In various embodiments, the total node weight for each node is the first node weight. In various embodiments, the total node weight for each node is a combination of the first node weight and one or more of the second, third, fourth, and fifth node weights. The modified flight path is generated by the dynamic aircraft flight path generation system 202 based on the total node weight associated with each node. In various embodiments, the dynamic aircraft flight path generation system 202 selects the node from the first, second, and third nodes that is associated with the lowest total node weight. The dynamic aircraft flight path generation system 202 updates the current flight path of the aircraft 200 to a modified flight path via the selected node.

In various embodiments, the dynamic aircraft flight path generation system 202 issues a warning associated with the modified flight path via one or more onboard output devices. In at least one embodiment, the dynamic aircraft flight path generation system 202 issues an audio warning associated with the modified flight path via an onboard speaker 216 of the aircraft 200. In at least one embodiment, the dynamic aircraft flight path generation system 202 issues a visual warning associated with the modified flight path via an onboard display device 212 of the aircraft 200. In at least one embodiment, the dynamic aircraft flight path generation system 202 issues an audio warning associated with the modified flight path via the onboard speaker 216 and a visual warning associated with the modified flight path via the onboard display device 212.

At 324, the dynamic aircraft flight path generation system 202 implements the modified flight path. In at least one embodiment, the dynamic aircraft flight path generation system 202 implements the modified flight path in response to receipt of pilot authorization via a pilot input interface 18 of the aircraft 200. In at least one embodiment, if pilot authorization is not received, the dynamic aircraft flight path generation system 202 automatically implements the modified flight path after a pre-defined period of time following the display of the modified flight path as a suggested flight path on the onboard display device 212. The dynamic aircraft flight path generation system 202 returns to 302 and repeats the method 300 on a periodic basis to dynamically update the current flight path of the aircraft 200 to generate a modified flight path until the aircraft 200 arrives at the destination location or at an emergency landing location. In various embodiments, a Dijkstra algorithm may be implemented by the dynamic aircraft flight path generation system to generate the node weights.

Figure 4:
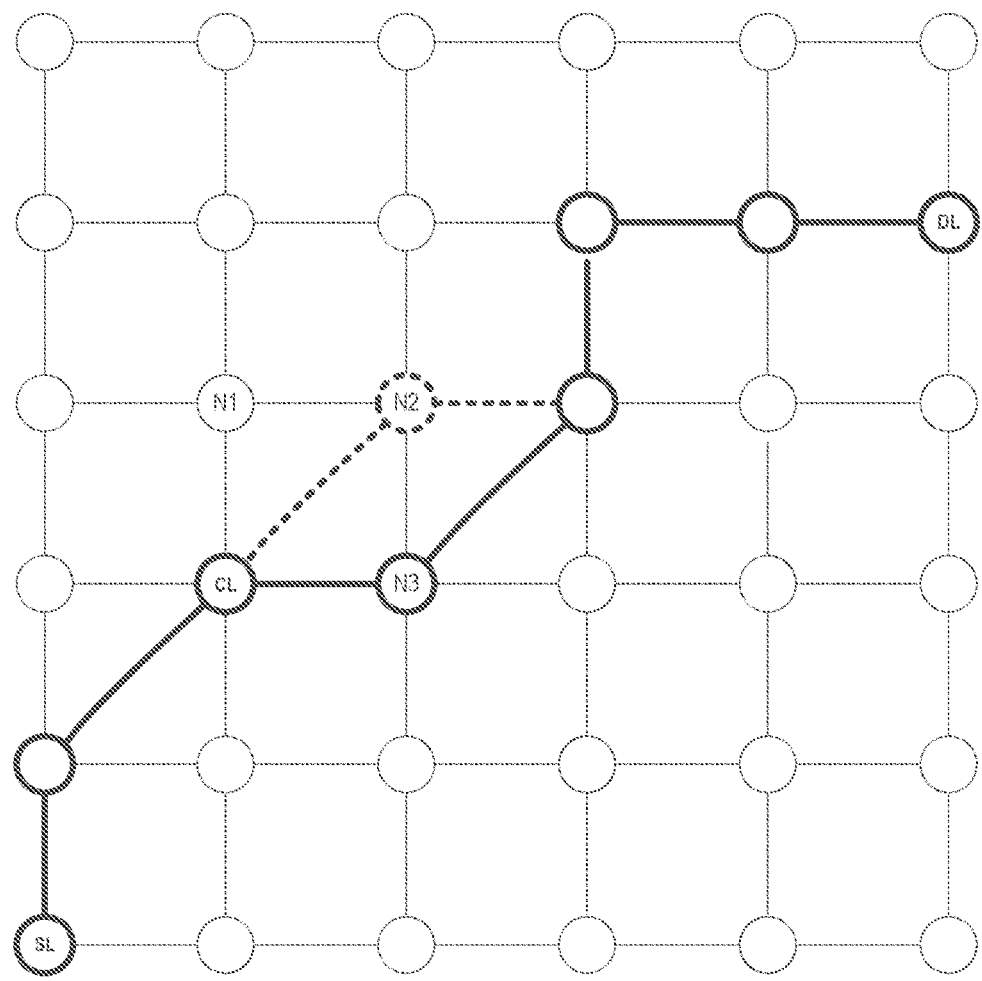
FIG. 4 is a diagrammatic representation of an exemplary a dynamically generated aircraft flight path overlaid on a two-dimensional mesh in accordance with at least one embodiment.

Referring to FIG. 4, a diagrammatic representation of an exemplary dynamically generated aircraft flight path overlaid on a two-dimensional mesh plane in accordance with at least one embodiment is shown. Each node in the two-dimensional mesh plane is associated with a pre-designated location. The pre-defined location associated with each node is defined by a longitude and a latitude. The two-dimensional mesh plane is an equidistant two-dimensional mesh plane where adjacent nodes in each row and in each column of the two-dimensional mesh are separated by equal distances.

The original flight path of the aircraft 200 extends between a source location SL and a destination location DL. The original flight path is represented by a bolded solid line defined by six nodes disposed between the source location SL and the destination location DL. The current aircraft location of the aircraft 200 is at the node CL. The first node N1, second N2, and third node N3 are closest to the current location CL of the aircraft 200.

The dynamic aircraft flight path generation system 202 received neighboring aircraft data associated with neighboring aircraft disposed within a pre-defined distance of the aircraft 200. The dynamic aircraft flight path generation system 202 generated a first node weight for each of the first node N1, the second node N2, and the third node N3 based on the neighboring aircraft data. In this example, the total node weight associated with each node N1, N2, N3 was the first node weight. The first node weights are associated with a risk of mid-air collision with a neighboring aircraft. The lower the first node weight, the lower the risk of a mid-air collision with a neighboring aircraft on a modified flight path of the aircraft 200 via that node.

The dynamic aircraft flight path generation system 202 determined that the second node N2 had the lowest first node weight. The original flight path of the aircraft 200 was via the third node N3. The dynamic aircraft flight path generation system 20 generated a modified flight path for the aircraft 200 via the second node N2. The modification to the original flight path to generate the modified flight path is represented by the bolded dotted lines.

In at least one embodiment, the dynamic aircraft flight path generation system 202 defines a current flight path of the aircraft 200 with respect to a three-dimensional mesh defined by a two-dimensional mesh plane and an altitude dimension. The three-dimensional mesh includes additional nodes that define the altitude dimension associated with the two-dimensional mesh. The dynamic aircraft flight path generation system 202 identifies the first, second, third, fourth, fifth, sixth, and seventh modes in the three-dimensional mesh that are closest to the current aircraft location of the aircraft 200. The dynamic aircraft flight path generation system 202 allocates node weights to each of the first, second, third, fourth, fifth, sixth, and seventh nodes based on neighboring aircraft data received from one or more neighboring aircraft. The dynamic aircraft flight path generation system 202 generates a modified aircraft flight path for the aircraft 200 based on the first, second, third, fourth, fifth, sixth, and seventh node weights.

In various embodiments, the total node weight for each node is the first node weight that is determined as described above with respect to the two-dimensional mesh plane. In various embodiments, the total node weight for each node is a combination of the first node weight and one or more of the second, third, fourth, and fifth node weights as described above with respect to the two-dimensional mesh plane. The modified flight path is generated by the dynamic aircraft flight path generation system 202 based on the total node weight associated with each node. In various embodiments, the dynamic aircraft flight path generation system 202 selects the node from the first, second, third, fourth, fifth, sixth, and seventh nodes that is associated with the lowest total node weight. The dynamic aircraft flight path generation system 202 updates the current flight path of the aircraft 200 to a modified flight path via the selected node.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A dynamic flight path generation system of an aircraft comprising:
   a flight management system (FMS);
   a communication circuit;
   an onboard display device; and
   a controller communicatively coupled to the FMS, the communication circuit, and the onboard display device, the controller being configured to:
     receive a current flight path of the aircraft from a current aircraft location to a destination location from the FMS;
     define the current flight path with respect to a two-dimensional mesh plane including a first plurality of nodes, wherein each node in the two-dimensional mesh plane is associated with a pre-designated location;
     identify first, second, and third nodes of the first plurality of nodes that are the closest to the current aircraft location;
     receive neighboring aircraft data associated with a neighboring aircraft disposed within a pre-defined distance of the aircraft via the communication circuit, the neighboring aircraft data comprising a neighboring aircraft location associated with the neighboring aircraft;
     allocate first node weights to the first, second, and third nodes based at least in part on a proximity of the pre-designated locations of the first, second, and third nodes to the neighboring aircraft location of the neighboring aircraft, wherein:
       a highest first node weight is associated with a first risk of contact of the aircraft with the neighboring aircraft,
       a second highest first node weight is associated with a second risk of contact of the aircraft with the neighboring aircraft,
       a lowest first node weight is associated with a third risk of contact of the aircraft with the neighboring aircraft, and
       the first risk of contact is greater than the second risk contact and the second risk of contact is greater than the third risk of contact; and
     generate a modified flight path based at least in part on the first node weights for display as a suggested flight path on the onboard display device.

2. The system of claim 1, wherein the FMS is configured to receive the current aircraft location from a satellite-based augmentation (SBA) system via the communication circuit.

3. The system of claim 1, wherein the controller is configured to receive the neighboring aircraft data via the communication circuit from the neighboring aircraft via one of peer-to-peer communication and from a central ground station.

4. The system of claim 1, wherein the neighboring aircraft data comprises a neighboring aircraft velocity associated with the neighboring aircraft and the controller is configured to:
   receive a current aircraft velocity from a satellite-based augmentation (SBA) system via the communication circuit; and
   allocate the first node weights to the first, second, and third nodes based at least in part on the current aircraft velocity and the neighboring aircraft velocity of the neighboring aircraft.

5. The system of claim 1, wherein the controller is configured to:
   receive the neighboring aircraft data associated with the neighboring aircraft, the neighboring aircraft data comprising a current flight path of the neighboring aircraft; and
   allocate the first node weights to the first, second, and third nodes based at least in part on the current flight path of the neighboring aircraft.

6. The system of claim 1, wherein the controller is configured to:
   identify first, second, and third distances between the current aircraft location and the destination location via the first, second, and third nodes, respectively;
   allocate second node weights to the first, second, and third nodes based part on the first, second, and third distances, wherein:
     a highest second node weight is associated with the first distance,
     a second highest second node weight is associated with the second distance, and
     a lowest second node weight is associated with the third distance, and
     the first distance is greater than the second distance and the second distance is greater than the third distance; and
   generate the modified flight path based at least in part on the first node weights and the second node weights for display as the suggested flight path on the onboard display device.

7. The system of claim 1, wherein the controller is configured to:
   upon a determination that the aircraft is engaged in an emergency landing situation at an emergency landing location, identify first, second, and third distances between the current aircraft location and the emergency landing location via the first, second, and third nodes, respectively;
   allocate third node weights to the first, second, and third nodes based on the first, second, and third distances, wherein:
     a highest third node weight is associated with the first distance,
     a second highest third node weight is associated with the second distance,
     a lowest third node weight is associated with the third distance, and
     the first distance is greater than the second distance and the second distance greater than the third distance; and
   generate the modified flight path based at least in part on the first node weights and the third node weights for display as the suggested flight path on the onboard display device.

8. The system of claim 1, wherein the controller is configured to:

upon a determination that the neighboring aircraft is a rogue aircraft disposed at the neighboring aircraft location, identify first, second, and third distances between the current aircraft location and the neighboring aircraft location via the first, second, and third nodes, respectively;

allocate fourth node weights to the first, second, and third nodes based on the first, second, and third distances, wherein:
a highest fourth node weight is associated with the first distance,
a second highest fourth node weight is associated with the second distance,
a lowest fourth node weight is associated with the third distance, and
the first distance is less than the second distance and the second distance is less than the third distance; and generate the modified flight path based at least in part on the first node weights and the fourth node weights for display as the suggested flight path on the onboard display device.

9. The system of claim 1, wherein the controller is configured to:

receive the neighboring aircraft data associated with the neighboring aircraft, the neighboring aircraft data comprising first, second, and third neighboring aircraft node weights allocated by the at least one neighboring aircraft to the first, second, and third nodes, respectively;

allocate fifth node weights to the first, second, and third nodes based on the first, second, and third neighboring aircraft node weights, wherein:
a highest fifth node weight is associated with the first neighboring aircraft node weight,
a second highest fifth node weight is associated with the second neighboring aircraft node weight,
a lowest fifth node weight is associated with the third neighboring aircraft node weight, and
the first neighboring aircraft node weight is greater than the second neighboring aircraft node weight and the second neighboring aircraft node weight greater than the third neighboring aircraft node weight; and generate the modified flight path based at least in part on the first node weights and the fifth node weights for display as the suggested flight path on the onboard display device.

10. The system of claim 1, wherein the controller is configured to define the current flight path with respect to the two-dimensional mesh plane including the first plurality of nodes, wherein the pre-designated location associated with each node is defined as a longitude and a latitude.

11. The system of claim 1, wherein the controller is configured to receive the neighboring aircraft data associated with the neighboring aircraft, the neighboring aircraft being one of a manned aircraft and an unmanned aircraft.

12. The system of claim 1, wherein the controller is configured to receive a broadcast message comprising the neighboring aircraft data from the neighboring aircraft via a broadcast communication channel at the communication circuit.

13. The system of claim 1, wherein the controller is configured to implement the modified flight path in response to one of receipt of pilot authorization and following a pre-defined period of time following the display of the suggested flight path on the onboard display device.

14. The system of claim 1, wherein the system further comprises at least one onboard output device communicatively coupled to the controller and the controller is configured to issue at least one of an audio warning and a visual warning associated with the modified flight path via the at least one onboard output device.

15. The system of claim 1, wherein the controller is configured to:

define the current flight path with respect to a three-dimensional mesh defined by the two-dimensional mesh plane and an altitude dimension, wherein the three-dimensional mesh includes a second plurality of nodes and the second plurality of nodes includes the first plurality of nodes;

identify fourth, fifth, sixth, and seventh nodes of the second plurality of nodes that are the closest to the current aircraft location;

allocate the first node weights to the fourth, fifth, sixth, and seventh nodes based on a proximity of pre-designated locations of the fourth, fifth, sixth, and seventh nodes with respect to the neighboring aircraft location of the neighboring aircraft; and generate the modified aircraft flight path based at least in part on the first node weights applied to the fourth, fifth, sixth, and seventh nodes.

16. A method of dynamically generating a flight path of an aircraft comprising:

receiving a current flight path of the aircraft from a current aircraft location to a destination location from a flight management system (FMS) of the aircraft;

defining, by a dynamic flight path determination system of the aircraft, the current flight path with respect to a two-dimensional mesh plane including a first plurality of nodes, wherein each node in the two-dimensional mesh plane is associated with a pre-designated location;

identifying, by the dynamic flight path determination system, first, second, and third nodes of the first plurality of nodes that are the closest to the current aircraft location;

receiving, at the dynamic flight path determination system, neighboring aircraft data associated with a neighboring aircraft disposed within a pre-defined distance of the aircraft via a communication circuit of the aircraft, the neighboring aircraft data comprising a neighboring aircraft location associated with the neighboring aircraft;

allocating, by the dynamic flight path determination system, first node weights to the first, second, and third nodes based at least in part on a proximity of the pre-designated locations of the first, second, and third nodes with respect to the neighboring aircraft location of the neighboring aircraft, wherein:
a highest first node weight is associated with a first risk of contact of the aircraft with the neighboring aircraft,
a second highest first node weight is associated with a second risk of contact of the aircraft with the neighboring aircraft,
a lowest first node weight is associated with a third risk of contact of the aircraft with the neighboring aircraft, and
the first risk of contact is greater than the second risk contact and the second risk of contact is greater than the third risk of contact; and generating, by the dynamic flight path determination system, a modified flight path based at least in part on the first node weights for display as a suggested flight path on an onboard display device of the aircraft.

17. The method of claim 16, wherein the neighboring aircraft data comprises a neighboring aircraft velocity associated with the neighboring aircraft and the method further comprises:
- receiving, at the dynamic flight path determination system, a current aircraft velocity from a satellite-based augmentation (SBA) system via the communication circuit; and
- allocating, by the dynamic flight path determination system, the first node weights to the first, second, and third nodes based at least in part on the current aircraft velocity and the neighboring aircraft velocity of the neighboring aircraft.

18. The method of claim 16, further comprising:
- upon a determination, by the dynamic flight path determination system, that the aircraft is engaged in an emergency landing situation at an emergency landing location, identifying first, second, and third distances between the current aircraft location and the emergency landing location via the first, second and third nodes, respectively;
- allocating, by the dynamic flight path determination system, second node weights to the first, second, and third nodes based on the first, second and third distances, wherein:
  - a highest second node weight is associated with the first distance,
  - a second highest second node weight is associated with the second distance,
  - a lowest second node weight is associated with the third distance, and
  - the first distance is greater than the second distance and the second distance greater than the third distance; and
- generating the modified flight path based at least in part on the first node weights and the second node weights for display as the suggested flight path on the onboard display device.

19. The method of claim 16, further comprising:
- upon a determination, by the dynamic flight path determination system, that the neighboring aircraft is a rogue aircraft disposed at the neighboring aircraft location, identifying first, second, and third distances between the current aircraft location and the neighboring aircraft location via the first, second, and third nodes, respectively;
- allocating, by the dynamic flight path determination system, third node weights to the first, second, and third nodes based on the first, second, and third distances, wherein:
  - a highest third node weight is associated with the first distance,
  - a second highest third node weight is associated with the second distance,
  - a lowest third node weight is associated with the third distance, and
  - the first distance is less than the second distance and the second distance is less than the third distance; and
- generating the modified flight path based at least in part on the first node weights and the third node weights for display as the suggested flight path on the onboard display device.

20. The method of claim 16, further comprising:
- identifying, by the dynamic flight path determination system, first, second, and third distances between the current aircraft location and the destination location via the first, second, and third nodes, respectively; and
- allocating, by the dynamic flight path determination system, fourth node weights to the first, second, and third nodes based on the first, second, and third distances, wherein:
  - a highest fourth node weight is associated with the first distance,
  - a second highest fourth node weight is associated with the second distance,
  - a lowest fourth node weight is associated with the third distance, and
  - the first distance is greater than the second distance and the second distance greater than the third distance; and
- generating the modified flight path based at least in part on the first node weights and the fourth node weights for display as the suggested flight path on the onboard display device.

* * * * *